US008874746B1

(12) United States Patent
Gonzalez

(10) Patent No.: US 8,874,746 B1
(45) Date of Patent: Oct. 28, 2014

(54) COLLABORATION BETWEEN DISCRETE SYSTEMS AND A SHARED SYSTEM TO CONSOLIDATE SHARED STORAGE-RELATED SERVICES

(75) Inventor: Agustin Gonzalez, Davie, FL (US)

(73) Assignee: DataCore Software Corporation, Fort Lauderdale, FL (US)

(*) Notice: Subject to any disclaimer, the term of this patent is extended or adjusted under 35 U.S.C. 154(b) by 174 days.

(21) Appl. No.: 12/926,307

(22) Filed: Nov. 9, 2010

Related U.S. Application Data

(63) Continuation of application No. 12/786,132, filed on May 24, 2010, now abandoned.

(51) Int. Cl.
 *G06F 15/167* (2006.01)
 *G06F 3/06* (2006.01)

(52) U.S. Cl.
 CPC .............. *H01L 69/40* (2013.01); *G06F 3/067* (2013.01)
 USPC ........... 709/226; 709/214; 709/232; 709/203; 711/162; 711/100

(58) Field of Classification Search
 CPC . H04L 69/40; H04L 67/1095; H04L 67/1097; H04L 29/08549; H04L 67/2842; G06F 11/1456; G06F 11/1464; G06F 11/2074; G06F 11/201
 USPC .......... 709/223–226, 340, 710, 711; 711/114, 711/223, 229, 159, 203, 155, 100; 714/6.32, 19, 6.12
 See application file for complete search history.

(56) References Cited

U.S. PATENT DOCUMENTS

| | | | | |
|---|---|---|---|---|
| 7,464,238 | B1 * | 12/2008 | Yadav | 711/162 |
| 7,596,713 | B2 * | 9/2009 | Mani-Meitav et al. | 714/6.32 |
| 8,156,195 | B2 * | 4/2012 | Hagglund et al. | 709/217 |
| 8,312,234 | B2 * | 11/2012 | Sugimoto et al. | 711/161 |
| 8,396,917 | B2 * | 3/2013 | Kakeda et al. | 709/201 |
| 2001/0037371 | A1 * | 11/2001 | Ohran | 709/214 |
| 2007/0168396 | A1 * | 7/2007 | Adams et al. | 707/200 |
| 2008/0104347 | A1 * | 5/2008 | Iwamura et al. | 711/162 |
| 2008/0104443 | A1 * | 5/2008 | Akutsu et al. | 714/6 |
| 2009/0248953 | A1 * | 10/2009 | Satoyama et al. | 711/100 |
| 2009/0313503 | A1 * | 12/2009 | Atluri et al. | 714/19 |
| 2010/0169587 | A1 * | 7/2010 | Atluri et al. | 711/155 |

* cited by examiner

*Primary Examiner* — Robert Wilson
*Assistant Examiner* — Sai Aung
(74) *Attorney, Agent, or Firm* — Rader, Fishman & Grauer PLLC

(57) ABSTRACT

Collaboration between discrete systems and a shared system to consolidate shared storage-related services. In one example, shared, consolidated storage-related services and high-availability are provided by pairing each of a plurality of discrete block storage virtualization modules residing on each discrete computer system to a shared block storage virtualization module residing on a shared computer system, and maintaining logical volume coherency locally by each of the plurality of discrete block storage virtualization modules, and globally by the shared block storage virtualization module. Additionally, allocation of a set of block storage virtualization functions to be performed by at least one of the plurality of discrete block storage virtualization modules or the shared block storage virtualization module can be made according to the pairing.

27 Claims, 7 Drawing Sheets

COLLABORATION BETWEEN DISCRETE SYSTEMS AND A SHARED SYSTEM TO CONSOLIDATE SHARED STORAGE-RELATED SERVICES

CROSS REFERENCE TO RELATED APPLICATIONS

This is a continuation application of patent application Ser. No. 12/786,132, filed May 24, 2010, which is herein incorporated by reference in its entirety.

BACKGROUND OF THE INVENTION

1. Field of the Invention

This application relates generally to the virtualization of storage across multiple computer systems. More particularly, this invention relates to the collaboration between block storage virtualization modules executing inside one or more "discrete" computer systems and a block storage virtualization module executing on a separate "shared" computer system.

2. Description of the Related Art

Many computer systems, particularly server-class machines, come equipped with very powerful processors, large capacity direct-attached storage (DAS) and private logical volume management (LVM) functions. IT organizations divide workloads among multiples of these self-contained servers to independently scale throughput. This arrangement also helps to isolate applications from each other, making upgrades and troubleshooting easier. However, these "nothing shared" configurations suffer from poor capacity utilization and a duplication of storage management effort. Furthermore, each server is a single point of failure and disruption.

FIG. 1 is a block diagram illustrating an example of Servers 102a-c. Each server may be hosting several virtual machines (VM) with corresponding data storage provided via Direct-Attached Storage (DAS) 106a-c.

The shortcomings discussed above may be partially mitigated by connecting those multiple computer systems to a common set of external disks using a Storage Area Network (SAN). SAN-capable storage systems promote resource sharing and centralized storage management among the group of servers. Clustered systems may also depend on SANs to dynamically migrate and failover workloads between each other by transferring the running state of programs over shared storage.

However, relying on one shared storage system to provide all the storage resources and functions to multiple computer systems creates a serious single point of failure, even when the storage device is composed of internally redundant parts.

FIG. 2 is a schematic diagram illustrating an example of a single point of failure wherein Servers 202a-c depend on a single Internally Redundant External Storage Array 204. The Servers 202a-c may similarly implement VMs, and may further implement LVM to access virtual disks $A_1$-$Z_n$. Access to the Array 204 may be provided through a multipath IO (MPIO) driver using preferred and alternative paths.

Whenever the entire external storage system is taken out-of-service for planned or unplanned reasons, all computer systems 202a-c dependent on Array 204 lose access to their data and concurrently suffer downtime. In contrast, component failures in discrete computer systems with DAS impact only the physical machine on which they reside. For example, in FIG. 1, loss of access to disks 106b only affects server 102b.

Some storage virtualization products provide shared "virtual disk" access among multiple computer systems while eliminating storage as a single point of failure. They simultaneously mirror virtual disks between two or more physically-separated, external storage subsystems. When one storage subsystem is taken out-of-service, the surviving subsystem(s) continue to provide shared storage services over an alternate path.

FIG. 3 is a block diagram illustrating a configuration where all shared virtual disk resources and storage management functions are supplied to the computer systems 302a-c exclusively by two redundant external nodes 304a, 304b. The two nodes coordinate block storage virtualization functions in order to represent virtual disks in a consistent manner.

There are several concerns that are sometimes raised in connection with using such an implementation. One is concern with keeping all storage on the SAN with no local server resources to fall back upon. Second, organizations may not want to migrate all local data to new disks on the SAN or replace their existing DAS with new SAN-capable devices. Still others may be discouraged by the cost and complexity of the redundant equipment, cable paths and switching infrastructure necessary to eliminate single points of failure.

A solution that combines existing DAS and SAN storage resources could help overcome some of those impediments. For example, physical storage redundancy can be achieved by having each computer system independently mirror blocks of its logical volumes from DAS to a common external SAN storage system. However, only the LVM on the originating computer system can makes sense of the disk blocks stored on the SAN. Consequently, neither the external storage device nor any of the other computer systems can do anything useful with the mirrored blocks, even when given shared access to them. Therefore, this arrangement fails to address the requirement for coherent sharing of logical disks among the various computer systems and fails to eliminate the duplication of storage management.

Alternative approaches are needed to meet the requirements for physically-separate redundancy, as well as shared access to disk resources and centralized advanced functions.

SUMMARY OF THE INVENTION

Collaboration between discrete systems and a shared system to consolidate shared storage-related services. In one example, shared, consolidated storage-related services and high-availability are provided by pairing each of a plurality of discrete block storage virtualization modules residing on each discrete computer system to a shared block storage virtualization module residing on a shared computer system, and maintaining logical volume coherency locally by each of the plurality of discrete block storage virtualization modules, and globally by the shared block storage virtualization module. Additionally, allocation of a set of block storage virtualization functions to be performed by at least one of the plurality of discrete block storage virtualization modules or the shared block storage virtualization module can be made according to the pairing.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

Figure 1:
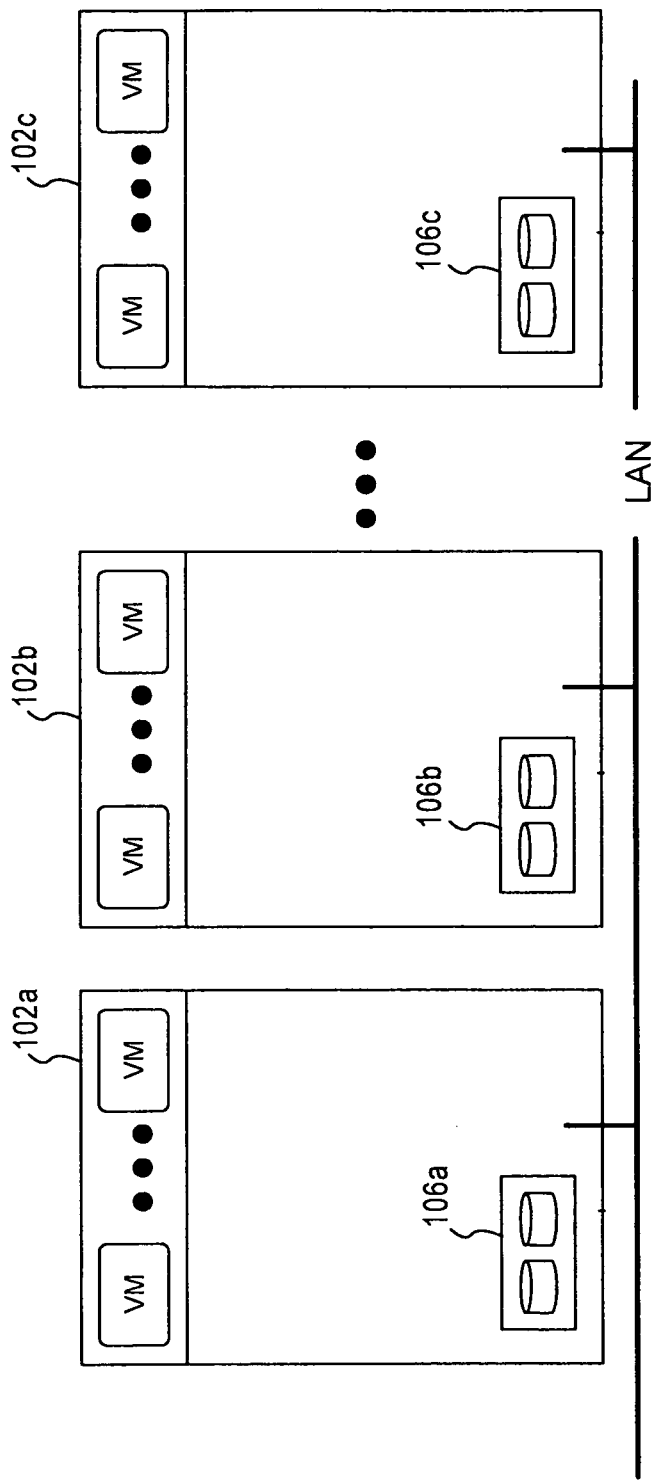
FIG. 1 is a block diagram illustrating an example of Servers with Direct-Attached Storage (DAS).
Figure 2:
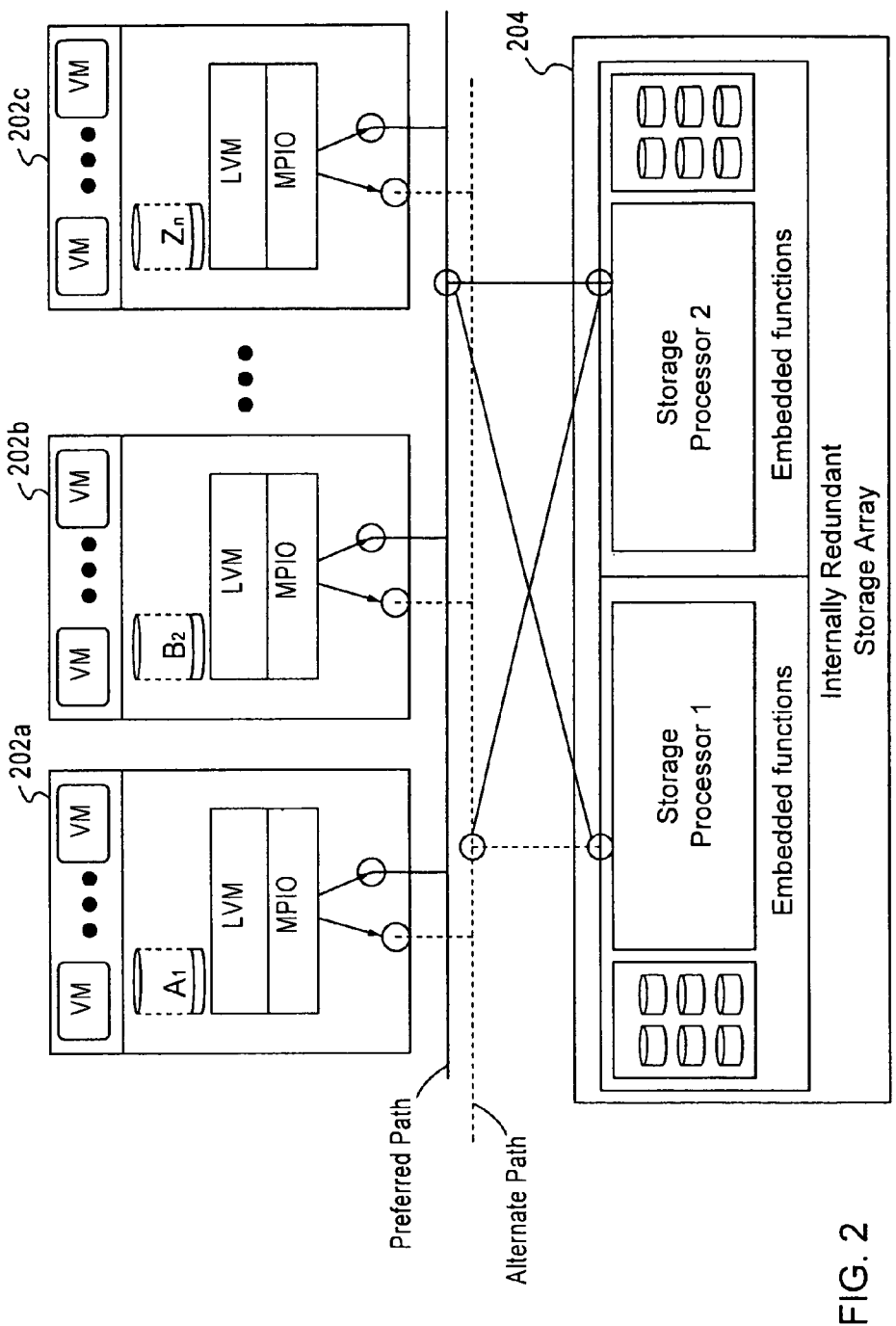
FIG. 2 is a schematic diagram illustrating an example of a potential single point of failure when multiple discrete computer systems are completely dependent an internally redundant external storage array.
Figure 3:
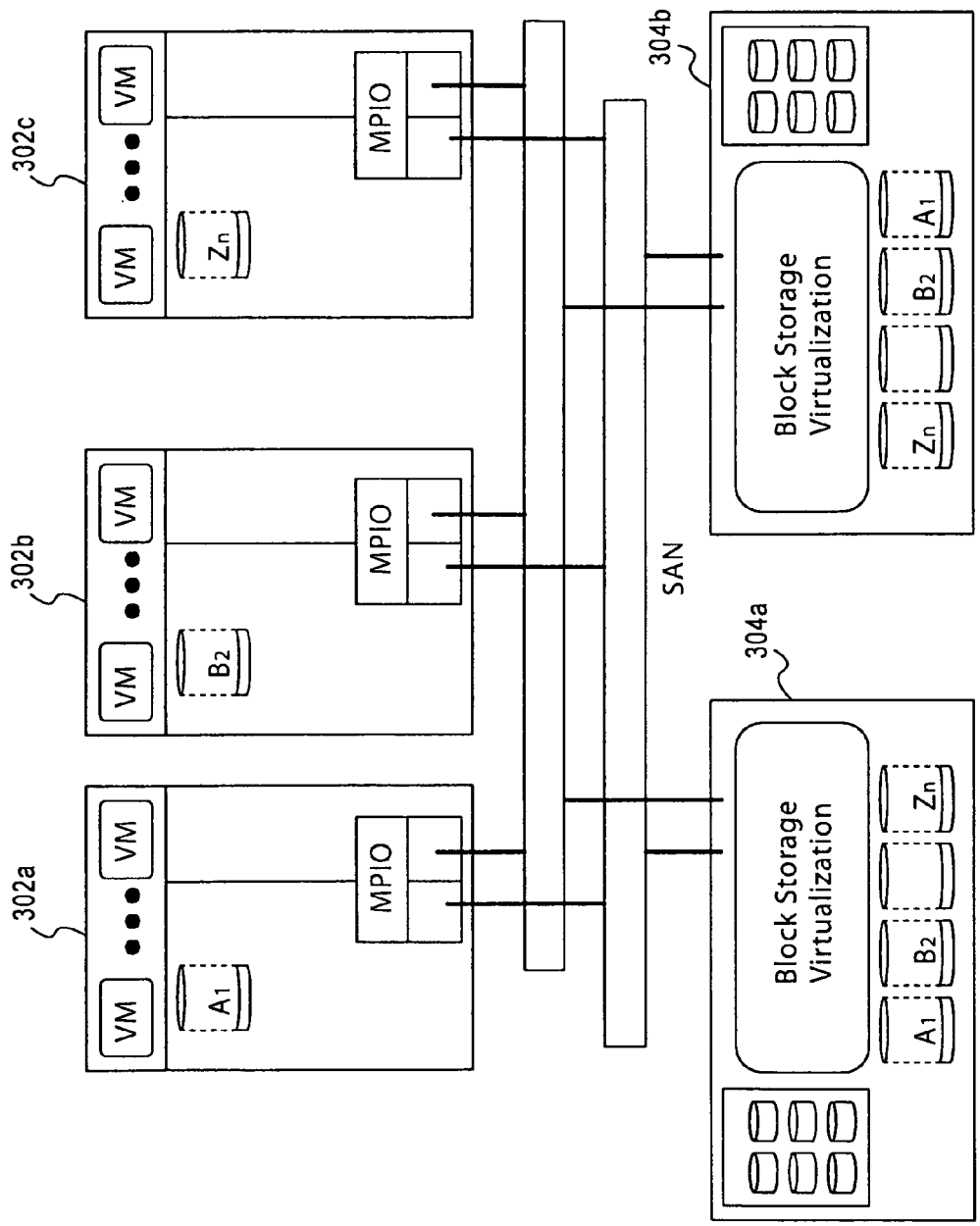
FIG. 3 is a block diagram illustrating a configuration where disk resources and advanced storage management functions are supplied exclusively by two redundant external block storage virtualization nodes.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

In one aspect, an example described herein offers hardware-independent storage virtualization and corresponding consolidated storage-related services across multiple computer systems, and more particularly, collaboration between block storage virtualization modules executing inside one or more "discrete" computer systems and a common "shared" block storage virtualization module executing on a separate, shared node. The many-to-1 pairing provides high availability, strong data protection, faster performance and convenient and coherent access to a distributed set of disk resources and advanced storage-related functions using the fewest number of components and control points. Examples of the storage-related functions available to each of the computer systems through the shared node may include synchronous mirroring, asynchronous remote replication, online snapshots, shared virtual disks, continuous data protection (CDP) and thinly provisioned capacity. These shared functions supplement functions such as caching and thin provisioning provided locally to each computer system by the discrete block storage virtualization modules.

An example embodiment described herein coordinates block storage virtualization functions between multiple discrete computer systems and a separate shared computer system to consolidate shared storage-related services and to achieve high-availability for the group. This example entails individually pairing a plurality of discrete computer systems with a common, shared node.

Collaboration between the discrete block storage virtualization module executing on each computer system and the shared block storage virtualization module maintains logical volume coherency locally on each system as well as globally. That is, logical volumes (or virtual disks) accessed locally by any one of the computer systems are also replicated to the shared node for a) high-availability, b) concurrent access by any of the other computer systems connected to the shared node, and c) concurrent access by storage-related services residing on the shared node.

In contrast to high-availability designs that require dedicated pairs of homogeneous storage systems to achieve redundancy, this invention takes advantage of one shared node to act as the redundant pair for any of the other computer systems. The physical makeup (resources, power and hardware/software configuration) of the discrete systems need not be identical to that of the shared node. With the described architecture, this uniquely offers orthogonal behavior collectively, despite the apparent architectural asymmetry of using mismatched systems at each end.

The pairing of discrete and shared systems supports replication of contents between the various systems. It also supports indirect collaboration between the discrete systems using the shared node as an intermediary. These features further support access to a common set of consolidated services provided by the shared node on the replicated contents.

This example includes explicit collaboration between discrete block storage virtualization modules (BSVMs) executing on multiple computer systems (e.g., physical and/or virtual servers) and a single shared BSVM executing on a separate shared node to achieve high availability, fast performance, strong data protection and centralized, advanced storage management functions.

Figure 4:
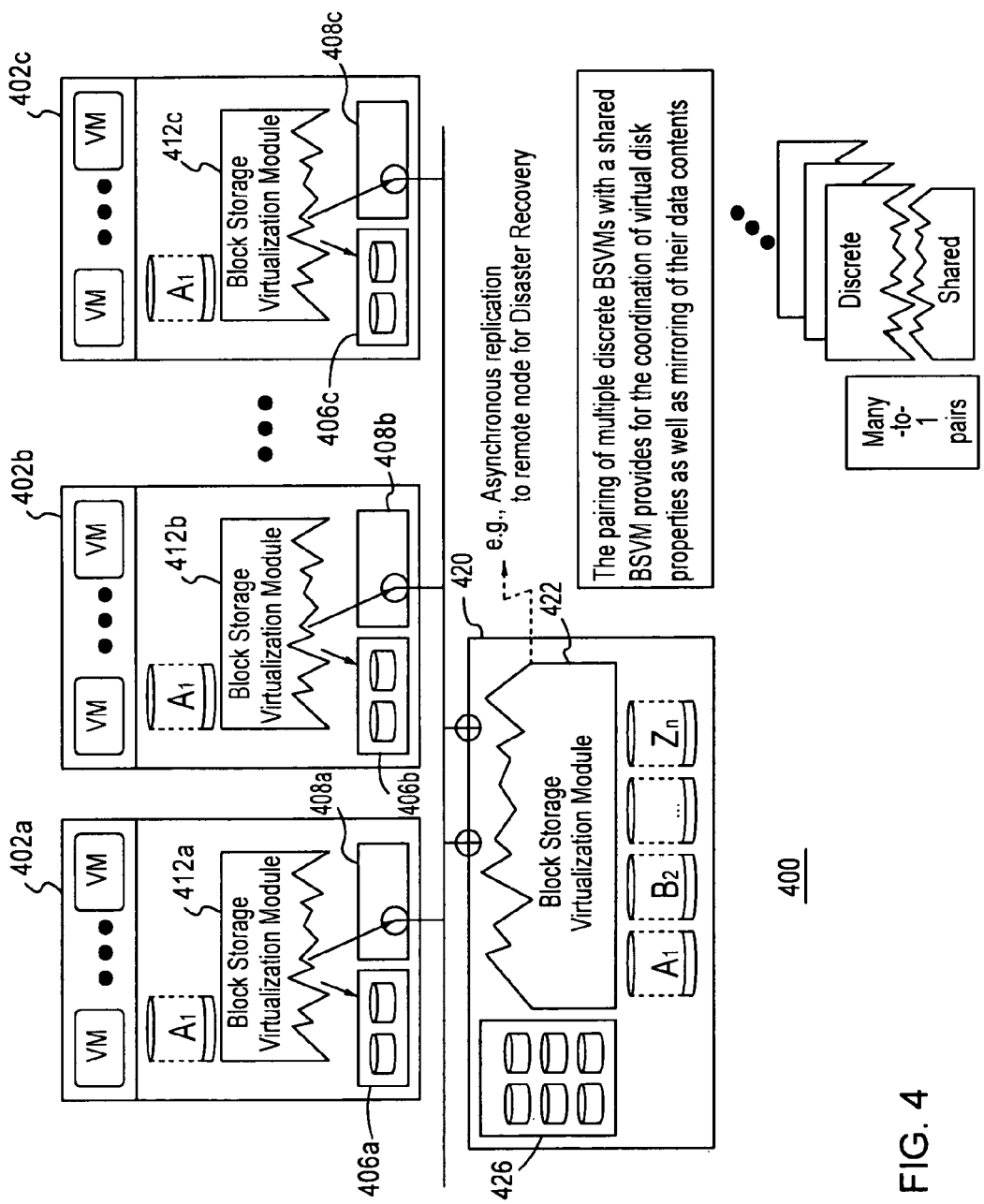
FIG. 4 is a block diagram illustrating a system including the many-to-1 pairings of discrete block virtualization modules with a separate, shared block storage virtualization module.

FIG. 4 is a block diagram illustrating an example of a system 400 including the many-to-1 pairings of discrete BSVMs 412a-c and a shared BSVM 422.

The system 400 includes multiple discrete computer systems 402a-c respectively configured with the discrete BSVMs 412a-c.

The computer systems 402a-c may comprise physical and/or virtual servers that provide computing platforms. Optionally the computer systems 402a-c may host one or more Virtual Machines (VM) that have corresponding access to the computing resources, virtual disk functions, and data storage of the computer system.

The BSVMs 412a-c include program code that is executed to provide the functionality described herein. The BSVMs 412a-c may be provided as hardware, firmware, software, or combinations thereof to embody the program code that is executed to provide this functionality.

In one embodiment, the BSVMs 412a-c are embodied as a computer readable medium storing the program code that is executed on a computing platform to provide the functionality described herein. Examples of computer readable media include but are not limited to optical disks, hard disks, floppy disks, solid state disks, flash memory, or magnetic tape.

The system 400 also includes a shared computer system 420 configured with the shared BSVM 422.

This computer system 420 also may comprise physical and/or virtual servers that provide computing platforms. Similarly, the BSVM 422 includes program code that is executed to provide the functionality described herein. The BSVM 422 may be provided as hardware, firmware, software, or combinations thereof to embody the program code that is executed to provide this functionality.

In one embodiment, the BSVM 422 is also embodied as a computer readable medium storing the program code that is executed to provide the functionality described herein.

The discrete computer systems 402a-c optionally have local physical storage resources 406a-c (e.g., disks). The shared computer system 420 preferably includes physical storage resources 426.

It is noted that although a line to the local storage resources 406a-c and a line corresponding to the shared side is indicated in FIG. 4, this does not constitute a requirement for a multipath IO driver as is provided in certain redundant storage array systems as previously described. The BSVM 412a-c includes software for accommodating where IO is directed, whether to the local disks or to the shared node. In this fashion, a conventional external path 408a-c may be provided to the shared node in lieu of a multipath IO driver.

The discrete computer systems 402a-c also include a logical volume management (LVM) function that manages logical volumes such as in the support of virtual disk presentations (e.g., virtual disks $A_1$-$Z_n$). Although each discrete computer system 402a-c is illustrated as having virtual disk $A_1$, this is only an example. There are certainly examples where a particular virtual disk is not shared among other discrete computer systems. The LVM function may be provided as part of the BSVMs 412a-c, 422 or may be provided separately.

The shared system 400 provides a mechanism for adding external shared storage resources and advanced functions into a working environment with minimal intrusion and optimum use of existing local resources. It also enables the discrete computer systems 402a-c to continue to operate independently using their local resources should they lose access to the shared node. That is, each of the discrete computer systems 402a-c and corresponding BSVMs 412a-c are configured to operate in autonomous fashion in the event that the shared node fails or is otherwise unavailable.

Additionally, there is an allocation of a set of block storage virtualization functions to be performed by one or more of the plurality of discrete block storage virtualization modules or the shared block storage virtualization module according to the pairing. The allocation of the set of block storage virtualization functions may be performed statically or dynamically. Additionally, the allocation and configuration of the set of block storage virtualization functions may be performed under centralized control.

The invention is applicable to both physical and virtual computer systems, whether independent or clustered. It is noted that additional economies of scale are possible with virtual servers because a greater number of separate virtual machines gain the added benefits of the resources and functions available discretely and shared.

The architecture of this system 400 takes block storage virtualization functions typically performed between dedicated nodes external to the discrete computer systems 402a-c and splits them into a discrete module executing internally to each computer system 402a-c and another module executing externally (shared). The shared BSVM module 422 may be shared by all the computer systems 402a-c, such as over a storage area network (SAN).

It is also noted that in one example, the discrete BSVMs 412a-c and the shared BSVM 422 may be similar or identical modules that are respectively installed on the discrete and shared node computer systems. Additionally, there may be fixed or, alternatively, dynamic allocation of functions provided between the discrete BSVMs 412a-c and the shared BSVM 422.

The computing resources of the discrete BSVMs 412a-c are not necessarily identical to those of the shared node (i.e., they may be non-homogenous pairs). With the described architecture, the system 400 uniquely offers orthogonal behavior collectively, despite the potential for apparent architectural asymmetry and mismatched systems.

The following description offers a detailed example of an allocation of BSVM functions, but the present invention is not limited to the described allocation. That is, a different set of functions may be provided on the discrete computer systems and/or the shared node. Additionally, the allocation may be balanced or imbalanced, fixed or dynamic as between discrete node(s) and the shared node.

In these "many-to-1" pairings, the discrete BSVM 412a-c transparently intercept I/Os and provide well-behaved virtual disks (e.g., $A_1$) according to a logical volume construct. The virtual disks and corresponding BSVM 412a-c functions offer several value added characteristics over conventional local disks.

An example of discrete BSVM 412a-c functions is provided as follows, noting that the given environment, design considerations, available computing resources and other factors will warrant alternative allocations. The example of these functions includes:

a) Synchronously mirroring to the shared node 420 any updates written to virtual disks that require additional redundancy (e.g., $A_1$ may be a mirrored disk);

b) Accelerating disk access (read and write) through discrete caching of I/Os c) Thin provisioning disk space from local disks 406a-c;

d) Pass-through access to the existing contents of the local disks 406a-c;

e) Failover to the shared mirrored virtual disks on 420 without disruption when a local physical disk is out-of-service;

f) Shared access to mirrored virtual disks on the shared node 420 updated by a different computer system in a cluster.

The shared BSVM 422 in turn handles additional functions on behalf of one or more of the discrete computer systems 402a-c that access it over the SAN. One example of these functions is listed below:

a) Maintaining up-to-date copies of any virtual disks mirrored to it by each discrete BSVM. Collaboration between the discrete and shared BSVM ensures that the logical representation of these mirrored virtual disks remain coherent regardless of whether it is accessed discretely or shared (potentially by another computer system);

b) Re-synchronizing discrete virtual disks after they are returned to service following an planned outage, upgrade or failure;

c) Thin provisioning disk space;

d) Generating point-in-time snapshots of selected virtual disks;

e) Making mirrored virtual disks (or their snapshots) accessible to other computer systems according to user-defined permissions. For example, clustered shared volumes;

f) Asynchronously replicating selected virtual disks to remote nodes; and g) Providing continuous data protection (CDP) for selected virtual disks.

The combination of discrete and shared BSVMs illustrated in FIG. 4 offers greater resiliency than either could provide alone. Not only does it eliminate single points of failure and disruption attributed to storage, but it also limits the impact of double failures. For example, if both the shared node and one of the computer systems were completely taken out-of-service, the surviving computer systems can continue to operate using their local disks.

This is in contrast to systems wherein if redundant external shared nodes are taken out of service simultaneously, all of the discrete virtual servers would lose access to their data.

Additional data protection measures are available by asynchronously replicating virtual disks from the shared node to a remote disaster recovery location where it is not susceptible to site-wide threats. Thus, even if the discrete and shared physical resources are taken out of service, a remote back-up remains available.

In one example, the discrete and shared block virtualization modules may optionally be administered centrally through console access to the shared node. This arrangement could reduce administrative overhead compared to architectures that require separate management of each discrete storage resource and/or discrete computer system.

The discrete node BSVM 412a-c may run in any conventional environment including but not limited to standard Windows operating systems and the hypervisors that support such environments. These include running natively on Microsoft Hyper-V, or as a VM in it or a VMware ESX or a Citrix XenServer environment.

The discrete BSVM 412a-c is also configured to discover local storage resources as well any shared BSVM 422. Collaboration between the discrete BSVMs and the shared BSVM reduces the need for explicit manual configuration of many parameters required in other architectures. For example, determining which mirrored virtual disks must be assigned to specific computer systems can be very time consuming when numerous virtual or physical machines are first connected to centralized storage systems.

Although there may also be embodiments where it is preferable to have one or more given discrete nodes handle functions to further efficient usage of computing resources, the shared BSVM 422 may provide a logical place to offload and centralize functions that are valuable to two or more of the discrete computer systems (and or virtual machines hosted on them). The consolidation is possible because the shared BSVM 422 collaborates with each discrete BSVMs 412a-c to maintain a coherent view of the mirrored virtual disks. Consequently it can perform virtual disk operations like snapshots, asynchronous replication and continuous data protection using its shared mirrored copy without disturbing the discrete computer systems that benefit from these services.

Any given discrete BSVM can provide local RAID, thin provisioning, and/or caching, all according to the same logical volume construct of the BSVM on the paired shared node.

For example, a given virtual disk "A1" as illustrated in FIG. 4 is an example of such a virtual disk. This virtual disk may be thin provisioned. Additionally, a disk block cache may be provided corresponding to the virtual disk(s) on the local (discrete) computer system. Still further, physical disk drives may be optionally implemented on a discrete computer system 402a-c, underneath the BSVM as a RAID set.

Workloads on the discrete computer systems operate on the virtual disk, with the discrete BSVM 412a-c managing coherency with what is ultimately stored on the local physical disks (if applicable). Additionally, the logical volume construct of the virtual disk carries over to the shared BSVM 422.

The shared BSVM 422 also receives storage requests according to the logical volume construct and manages coherency using the shared physical storage. In one embodiment, when a mirrored shared disk is written to by a discrete computer system other than the one that keeps its internal copy, then the shared BSVM 422 can re-synchronize the internal copy of another discrete computer system.

At the same time, the shared BSVM 422 provides extended virtual storage properties for any given virtual disk, including high availability, sharing of logical disks among separate virtual servers, supporting the migration of virtual machines from one virtual server to other(s), thin provisioning, snapshots, continuous data protection (CDP), etc.

Additionally, asynchronous replication to a remote node for disaster recovery may be provided for the virtual disks, without incurring performance degradation on the discrete computer systems.

One advantage of having individual BSVMs 412a-c at each discrete computer system 402a-c is that local resources may be used in support of local performance requirements, while still making use of the economies of the shared resources. For example, local caching for superior responsiveness is one example of a performance enhancement. At the same time, the common shared resources and corresponding logical volume construct support both extended performance features as well as flexibility in terms of recovery and migration.

It is reiterated that the description above is an example of the allocation of functions among the discrete BSVMs 412a-c and the shared BSVM 422. Other allocations are equally applicable to and encompassed by the present invention, and will depend upon various factors as described previously.

Figure 5:
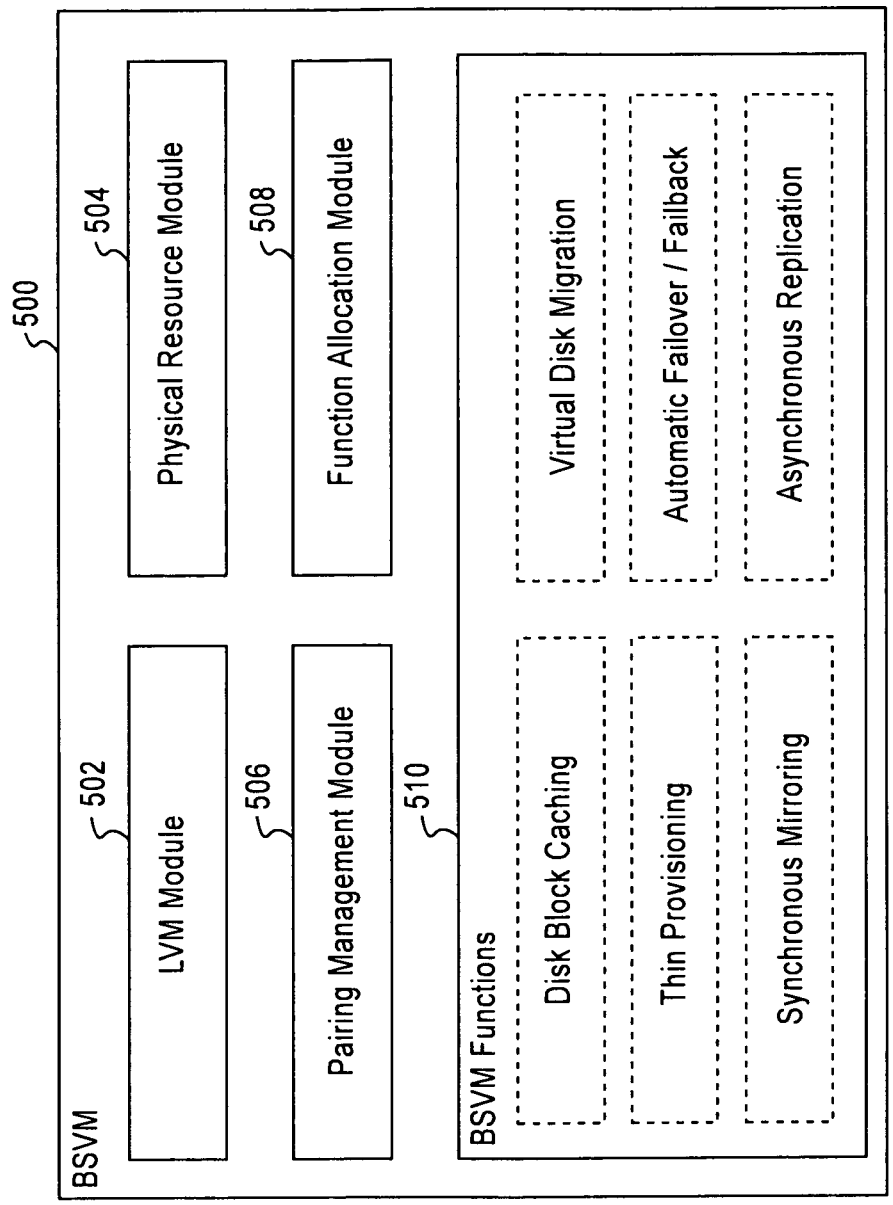
FIG. 5 is a block diagram illustrating an example of a BSVM.

FIG. 5 is a block diagram illustrating an example of a BSVM 500. The BSVM 500 may be a discrete BSVM or a shared BSVM (configured accordingly). The BSVM 500 includes a Logical Volume Management (LVM) module 502, a physical resource module 504, a pairing management module 506, a function allocation module 508 and functions modules 510.

As explained above, the BSVM 500 may be provided as hardware, firmware or software, or combinations thereof, and is provided as program code executable to perform the functionality described herein. It may be variously embodied, such as in a computer system, or stored on a computer readable medium. Additionally, execution of the program code results in a corresponding process for storage virtualization.

The LVM module 502 retains a logical volume construct that is applicable to any and all BSVMs 500 of a given system (discrete and shared). This supports provision of functions by both any given discrete BSVM or the shared BSVM, including coherent disk block caching, thin provisioning, synchronous mirroring, virtual disk migration, snapshots, asynchronous remote replication, etc.

The physical resource module 504 identifies physical resources locally associated with a BSVM and optionally for the system comprising the shared and discrete BSVMs (particularly for the shared BSVM). Additionally, the allocation of physical resources to storage pools or other constructs correlating the physical resources to logical volumes is managed by the physical resource module 504.

The pairing management module 506 identifies the discrete and shared nodes in the system comprising the multiple discrete BSVMs and shared BSVM.

The function allocation module 508 identifies a group of functions that are available in the BSVM 500, as well as an indication as to which functions are currently performed by the BSVM 500. As noted, the BSVM 500 may be a discrete BSVM or a shared BSVM. As described above, the allocation of functions may be fixed or may be dynamic (e.g., updating based upon the availability of resources). In a fixed allocation mode, the BSVM 500 (whether discrete or shared) will perform whichever of the available functions are designated.

In a dynamic allocation mode, the BSVM 500 adjusts the functions to be performed, such as based upon processing conditions and corresponding metrics that dictate whether a function should be shifted to or from the shared BSVM or another discrete BSVM.

For example, in one scenario, the preferred access path to a virtual disk may be directed to use the physical disks on the discrete node when those disk drives are deemed to be faster performing. However, the preferred path may be switched to access the virtual disks through the shared nodes when the shared nodes' disk drives are deemed faster and less loaded.

An alternative example is to shift asynchronous replication from the shared node to a specific discrete node during periods when the shared node's remote network remote connection is temporarily out-of-service. Since any of the discrete nodes can see the shared virtual disk, they can take on the added value service even though they do not keep a local copy of it stored on their discrete physical disks.

The BSVM functions modules 510 provide the functions described above, including but not limited to coherent disk block caching, thin provisioning, synchronous mirroring, virtual disk migration, snapshots, virtual disk failover and failback, asynchronous remote replication, etc. Each of these functions may be individually realized according to conventional storage management techniques, but they are uniquely allocated between the shared and discrete BSVMs as described herein. Additionally, each of the functions are depicted with dotted lines, one, several or all of the functions may be active for any given BSVM, depending upon the environment and whether the BSVM is executing on a shared or discrete node.

Figure 7:
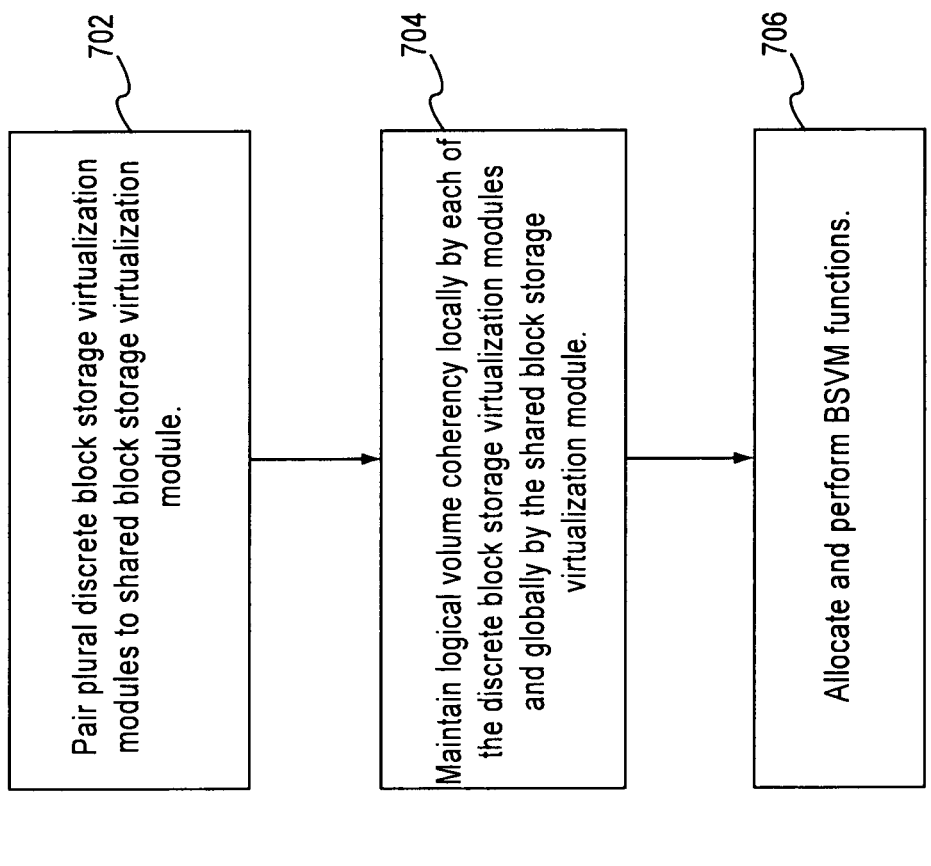
FIG. 7 is a flow diagram illustrating a method for storage management using discrete and shared BSVM pairing.

Generally, the BSVM(s) provide hardware-independent storage virtualization and centralized storage management (FIG. 7, 700) that comprises pairing (702) each of a plurality of discrete block storage virtualization modules to a shared block storage virtualization module, and maintaining (704) logical volume coherency locally by each of the plurality of discrete block storage virtualization modules, and globally by the shared block storage virtualization module.

A variety of supported functions that would otherwise not be available, or that are significantly advanced by the shared and discrete BSVM node pairing, are also realized. As variously described above, given the pairing of BSVM nodes a corresponding allocation and performance (706) of the various functions is performed.

As described, the functions may be fixedly or dynamically allocated among the BSVM nodes.

The allocatable functions include sharing a virtual disk between a first discrete block storage virtualization module and a second discrete block storage virtualization module using the shared block storage virtualization modules as the intermediary.

The logical volume coherency of the virtual disk is maintained across each of the plurality of discrete block storage virtualization modules and the shared block storage virtualization module, in contrast to systems that merely provide common storage resource access through an outboard node.

Additionally, a shared block storage virtualization module supports offloading of storage functions from the discrete computer systems by performing those functions on one or more virtual disks that are mirrored to the shared block virtualization module.

The functions also include migrating a virtual disk between a first discrete block storage virtualization module and a second discrete block storage virtualization module of the plurality of discrete block storage virtualization modules using the shared BSVM as the intermediary.

Additionally, a computer system implementing one of the discrete block storage virtualization modules may have corresponding local physical storage resources storing data corresponding to the maintained logical volumes. There, anytime the local physical storage resources are taken out of service, it prompts a non-disruptive, automatic failover to alternative physical storage resources corresponding to the shared block storage virtualization module.

Still further, the functions comprise asynchronously replicating virtual disks to a remote site on behalf of one or more of the discrete block storage virtualization modules as described further above.

These and other functions as described above are provided by the pairing of multiple discrete BSVMs to the shared BSVM.

Figure 6:
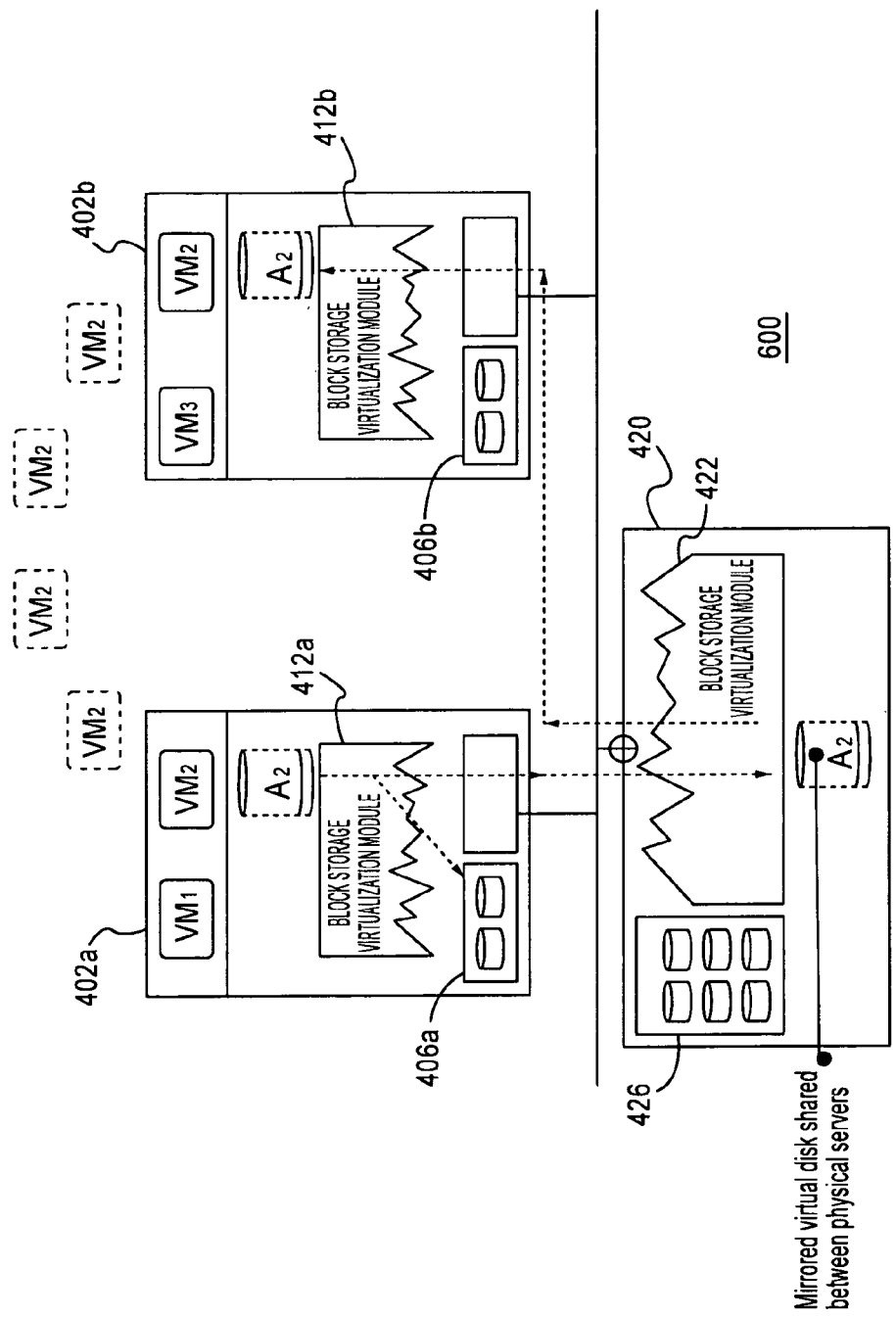
FIG. 6 illustrates an example of migrating a virtual machine from one server to another using virtual disk A2, as supported by the paired BSVMs.

FIG. 6 illustrates an example of migrating a virtual machine from one server to another, as supported by the paired BSVMs described herein. The discrete computer systems 402*a-b*, 420, and their BSVM 412*a-b*, shared BSVM 422 and corresponding physical storage resources 406*a-b*, 426 are as described above.

Specifically, FIG. 6 illustrates migrating (or failing over) of a $VM_2$ from a first computer system 402*a* to a second computer system 402*b*, which are physical servers in this example. The $VM_2$ relies upon a highly available shared virtual disk $A_2$ that may be accessed by either discrete computer system 402*a-b* through the shared BSVM 422. A hypervisor may than instantiate the VM by managing access to the virtual disks. For a failover, all of the necessary information is presented at the shared node even if one of the discrete computer systems fails.

Another example embodiment provides computing resources according to the architecture described above, with the discrete and shared nodes not necessarily providing storage-related functions, but alternative computing services according to the same architecture. For example, the pairing between discrete and shared nodes would provide for the mirroring and logical coherency of virtual memory rather than virtual disks. In this case memory replication and point-in-time snapshots could be captured on the shared node. Thus, the described architecture according to this example provides high availability, distributed memory systems.

The characteristics and computing resources provided by the discrete nodes are not necessarily identical (i.e., they may be non-homogenous pairs). With the described architecture, this uniquely offers orthogonal behavior collectively, despite apparent asymmetry and mismatched nodes.

The pairing of discrete and shared nodes supports replication of contents between the various nodes. It also supports indirect collaboration between the discrete nodes using the shared node as an intermediary. These features further support access to a common set of consolidated services provided by the shared node on the replicated contents.

Thus embodiments of the present invention produce and provide storage virtualization distributed among multiple discrete block storage virtualization modules paired to a common shared storage virtualization module. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for providing shared, consolidated storage-related services and high-availability, the method comprising:

pairing each of a plurality of discrete block storage virtualization modules to a shared block storage virtualization module, each of the discrete block storage virtualization modules and the shared block storage virtualization module respectively residing on separate application servers, each of the discrete block storage virtualization modules and the shared block storage virtualization modules performing block storage virtualization functions that include presentation of a given virtual disk, the plurality of discrete block storage virtualization modules and the shared block storage virtualization module being distinct from dedicated physical storage resources;

maintaining logical volume coherency locally by and among each of the plurality of discrete block storage virtualization modules, and globally by the shared block storage virtualization module; and allocating a set of the block storage virtualization functions to be performed between one of the plurality of discrete block storage virtualization modules and the shared block storage virtualization module according to the pairing, wherein the set of the block storage virtualization functions includes sharing the given virtual disk while maintaining logical volume coherency between a first discrete block storage virtualization module and a second discrete block storage virtualization module of the plurality of discrete block storage virtualization modules, using the shared block storage virtualization module as an intermediary.

2. The method of claim 1, wherein the allocation of the set of the block storage virtualization functions is performed dynamically.

3. The method of claim 1, wherein the allocation of the set of the block storage virtualization functions is performed under centralized control.

4. The method of claim 1, wherein said maintaining logical volume coherency comprises maintaining the logical volume coherency of the given virtual disk across each of the plurality of discrete block storage virtualization modules and the shared block storage virtualization module.

5. The method of claim 1, wherein virtual disks are synchronously mirrored between any of the plurality of discrete block storage virtualization modules and the shared block storage virtualization module to achieve high-availability across physically separate systems.

6. The method of claim 4, wherein the shared block storage virtualization module offloads a subset of the functions from one or more of the plurality of application servers by performing the subset of the functions on at least one virtual disk mirrored to the shared block virtualization module.

7. The method of claim 6, wherein the subset of the functions comprises asynchronously replicating at least one virtual disk to a remote site on behalf of the plurality of discrete block storage virtualization modules.

8. The method of claim 1, wherein the set of the block storage virtualization module functions includes virtual disk migration between a first discrete block storage virtualization module and a second discrete block storage virtualization module of the plurality of discrete block storage virtualization modules.

9. The method of claim 1, wherein one of the plurality of application servers implementing a discrete block storage virtualization module has corresponding local physical storage resources storing data corresponding to the given virtual disk, and wherein loss of access to the local physical storage resources prompts an automatic, non-disruptive failover to the given virtual disk as presented from the shared block storage virtualization module.

10. A computer program product for providing shared, consolidated storage-related services and high-availability, the computer program product comprising a non-transitory computer readable medium having program code stored thereon, which when executed performs operations comprising:

pairing each of a plurality of discrete block storage virtualization modules to a shared block storage virtualization module, each of the discrete block storage virtualization modules and the shared block storage virtualization module respectively residing on separate application servers, each of the discrete block storage virtualization modules and the shared block storage virtualization module performing block storage virtualization functions that include presentation of a given virtual disk, the plurality of discrete block storage virtualization modules and the shared block storage virtualization module being distinct from dedicated physical storage resources;

maintaining logical volume coherency locally by and among each of the plurality of discrete block storage virtualization modules, and globally by the shared block storage virtualization module; and allocating a set of the block storage virtualization functions to be performed between one of the plurality of discrete block storage virtualization modules and the shared block storage virtualization module according to the pairing, wherein the set of the block storage virtualization functions includes sharing the given virtual disk while maintaining logical volume coherency between a first discrete block storage virtualization module and a second discrete block storage virtualization module of the plurality of discrete block storage virtualization modules, using the shared block storage virtualization module as an intermediary.

11. The computer program product of claim 10, wherein said maintaining logical volume coherency comprises maintaining the logical volume coherency of the given virtual disk across each of the plurality of discrete block storage virtualization module and the shared block storage virtualization module.

12. The computer program product of claim 10, wherein virtual disks are synchronously mirrored between any of the plurality of discrete block storage virtualization modules and the shared block storage virtualization module to achieve high-availability across physically separate systems.

13. The computer program product o claim 10, wherein the shared block storage virtualization module offloads a subset of the functions from one or more of the plurality of application servers by performing the subset of the functions on at least one virtual disk mirrored to the shared block virtualization module.

14. The computer program product of claim 13, wherein the subset of the functions comprises asynchronously replicating at least one virtual disk to a remote site on behalf of the plurality of discrete block storage virtualization modules.

15. The computer program product o claim 10, wherein the set of the block storage virtualization module functions includes migrating a virtual disk between a first discrete block storage virtualization module and a second discrete block storage virtualization module of the plurality of discrete block storage virtualization modules.

16. The computer program product of claim 10, wherein one of the plurality of application servers implementing a discrete block storage virtualization module has corresponding local physical storage resources storing data corresponding to the given virtual disk, and wherein loss of access to the local physical storage resources prompts an automatic, non-disruptive failover to the given virtual disk as presented from the shared block storage virtualization module.

17. An apparatus for providing shared, consolidated storage-related services and high-availability, the apparatus comprising:
- a processor; and
- a memory, the memory storing program code executable to perform operations comprising:
- pairing each of a plurality of discrete block storage virtualization modules to a shared block storage virtualization module, each of the discrete block storage virtualization modules and the shared block storage virtualization module respectively residing on separate application servers, each of the discrete block storage virtualization modules and the shared block storage virtualization module performing block storage virtualization functions that include presentation of a given virtual disk, the plurality of discrete block storage virtualization modules and the shared block storage virtualization module being distinct from dedicated physical storage resources;
- maintaining logical volume coherency locally by and among each of the plurality of discrete block storage virtualization modules, and globally by the shared block storage virtualization module; and
- allocating a set of the block storage virtualization functions to be performed between one of the plurality of discrete block storage virtualization modules and the shared block storage virtualization module according to the pairing,
- wherein the set of the block storage virtualization functions includes sharing the given virtual disk while maintaining logical volume coherency between a first discrete block storage virtualization module and a second discrete block storage virtualization module of the plurality of discrete block storage virtualization modules, using the shared block storage virtualization module as an intermediary.

18. A system for hardware-independent storage virtualization and centralized storage management, the system comprising:
- a plurality of application servers that host one or more application programs, each application server respectively including a discrete block storage virtualization module; and
- a shared computer system hosting another application server that is separate from the plurality of application servers and including a shared block storage virtualization module, paired to each of the plurality of discrete block storage virtualization modules,
- each of the discrete block storage virtualization modules and the shared block storage virtualization module performing block storage virtualization functions that include presentation of a given virtual disk,
- the plurality of discrete block storage virtualization modules and the shared block storage virtualization module being distinct from dedicated physical storage resources,
- wherein logical volume coherency for each of the plurality of application servers is maintained locally by and among the respective discrete block storage virtualization modules, and is maintained globally by the shared block storage virtualization module,
- a set of the block storage virtualization functions to be performed is allocated between one of the plurality of discrete block storage virtualization modules and the shared block storage virtualization module according to the pairing, and
- the set of the block storage virtualization functions includes sharing the given virtual disk while maintaining logical volume coherency between a first discrete block storage virtualization module and a second discrete block storage virtualization module of the plurality of discrete block storage virtualization modules, using the shared block storage virtualization module as an intermediary.

19. The method of claim 1, wherein the separate application servers respectively of at least the discrete block storage virtualization modules respectively host one or more application programs that are enclosed in virtual machines residing on the plurality of application servers, such that each discrete block storage virtualization module respectively presents virtual disks to the application programs on the same application server in which the corresponding discrete block storage virtualization module resides.

20. The computer program product of claim 10, wherein the separate application servers of at least the discrete block storage virtualization modules respectively host one or more application programs that are enclosed in virtual machines residing on the application servers, such that each discrete block storage virtualization module respectively presents virtual disks to the application programs on the same application server in which the corresponding discrete block storage virtualization module resides.

21. The apparatus of claim 17, wherein the separate application servers of at least the discrete block storage virtualization modules respectively host one or more application programs that are enclosed in virtual machines residing on the of application servers, such that each discrete block storage virtualization module respectively presents virtual disks to the application programs on the same application server in which the corresponding discrete block storage virtualization module resides.

22. The method of claim 1, wherein the shared computer system comprises a server that provides a computing platform.

23. The computer program product of claim 10, wherein the shared computer system comprises a server that provides a computing platform.

24. The system of claim 18, wherein the shared computer system comprises a server that provides a computing platform.

25. The method of claim 1, wherein the separate application servers of at least the discrete block storage virtualization modules respectively host one or more application programs, such that each discrete block storage virtualization module respectively presents virtual disks to the application programs on the same application server in which the corresponding discrete block storage virtualization module resides.

26. The computer program product of claim 10, wherein the separate application servers of at least the discrete block storage virtualization modules respectively host one or more application programs, such that each discrete block storage virtualization module respectively presents virtual disks to the application programs on the same application server in which the corresponding discrete block storage virtualization module resides.

27. The apparatus of claim 17, wherein the separate application servers of at least the discrete block storage virtualization modules respectively host one or more application programs, such that each discrete block storage virtualization module respectively presents virtual disks to the application programs on the same application server in which the corresponding discrete block storage virtualization module resides.

* * * * *